Patented Feb. 21, 1950

2,498,099

UNITED STATES PATENT OFFICE 2,498,099

INTERPOLYMERS OF STYRENE, FUMARIC ESTERS, AND CHLORINATED ALKENES

Pliny O. Tawney and Jerome G. Kuderna, Jr., Passaic, N. J., assignors to United States Rubber Company, New York, N. Y., a corporation of New Jersey No Drawing. Application April 19, 1946, Serial No. 663,617

8 Claims. (Cl. 260—78.5)

Our invention comprises a method for preparing a new class of unsaturated polymeric materials of relatively low molecular weight which are soluble in a variety of organic liquids, but which are convertible to insoluble, infusible resins in the presence of heat and/or catalysts, by further polymerization or by copolymerization with reactive compounds containing an ethylenic linkage.

More particularly, our invention relates to new ternary interpolymers obtained from polymerizing a mixture of styrene, or para-substituted styrenes, with certain monomeric 2-alkenyl fumarates and certain monomeric 2-alkenyl halides. These new interpolymers are particularly suited to the formation of tough, flexible coatings and castings of improved flame-resistance. Moreover, the interpolymers of styrene, the fumarate and the halide, possess a high degree of compatibility with hydrocarbon solvents and are adapted economically to the preparation of cheap coating compositions.

It is known to copolymerize styrene with fumarates such as diallyl fumarate, dimethallyl fumarate, etc. The prior art has emphasized the difficulty of controlling such polymerizations, so as to produce soluble, fusible polymers. Various devices for increasing the yield of the soluble, fusible copolymers have been advocated such as carrying out the copolymerization at elevated temperatures, preferably in the range of 180° C. or higher. However, since the rate of copolymerization is enormously accelerated at these elevated temperatures, control of the reaction becomes difficult, particularly in a reaction vessel of industrial size, and premature insolubilization of the reaction mixture becomes increasingly difficult to avoid.

It has also been noted in the prior art that higher yields of soluble, fusible products can be obtained by copolymerization in the presence of a solvent, the concentration of the monomeric fumarate being kept below 40% by weight. However, the rate of polymerization tends to decrease in dilute solutions, the conversion of monomer to polymer is still comparatively inefficient, and the solvent increases the material cost, necessitates additional time and labor for its removal from the reaction product and lowers the production capacity of the reaction vessel.

We have now unexpectedly found that copolymerizing the styrene with the fumarate in the presence of a sufficient quantity, that is, at least 10% (based on the weight of the fumarate) of a monomeric halogeno-alkene having at least 3 carbon atoms, preferably those of the formula $C_nH_{2n-x}Cl_x$ where $n$ is an integer greater than 2, and $x$ is 1 or 2) by heating the mixture, preferably at temperatures below 120° C. and in the presence of a conventional peroxidic catalyst, gives high yields of soluble, fusible products. The reaction temperatures employed range from about 25° C. to about 120° C., although higher temperatures may be employed if desired. Examples of suitable per-oxy compound catalysts are acetyl peroxide, acetyl benzoyl peroxide, benzoyl peroxide, succinyl peroxide, and tertiary-butyl hydrogen peroxide.

The course of the copolymerization can be followed by observing the increase in the viscosity of the reaction mixture and when the copolymerization has proceeded to the desired extent, the reaction is halted by cooling. The resulting interpolymer can be isolated from the reaction mixture by distilling out any unreacted starting materials or by extracting them with a solvent in which the polymer is insoluble, such as n-hexane. The interpolymer can be further purified by dissolving it in a solvent for the polymer such as acetone and precipitating with a non-solvent such as n-hexane.

The concentration of monomers in the reaction mixture does not have to be kept below 40%; in fact the preparation of our new interpolymers can be carried out in the absence of any solvents other than the copolymerizable monomers themselves.

Since our interpolymers are readily soluble in the 2-alkenyl halides, we prefer to carry out the copolymerizations in the presence of an excess of the halide, for the resulting mobile free-flowing solutions are easily handled in transfer, mixing, storage and other mechanical operations to which the solid interpolymers themselves may be less amenable. The halide in our invention may thus serve not only as a copolymerizable monomer, but also as a cheap volatile solvent which because it shows little tendency to homopolymerize under these conditions can be easily removed from the reaction mixture by distillation and recovered for use in subsequent copolymerizations.

That our new products are ternary interpolymers of the styrene, the halide and the fumarate is indicated by elementary analysis and other specific tests. They contain, attached to the polymer chain, halomethyl groups derived from the interpolymerized halide molecules which render the polymer capable of being modified by treatment with appropriate reagents which replace the halogen with various groups such as hydroxyl, mercapto, alkoxy, alkenoxy, acyloxy, cyano, etc. Metathetical reactions can also be carried out with polyfunctional reagents such as the sodium salts of polycarboxylic acids, glycols, etc. By such reactions our new polymers can be converted into other modified polymers having desirable properties.

The fumarates which we have found to be most suitable in the practice of our invention are diallyl fumarate, dimethallyl fumarate and di-(2-chloroallyl) fumarate, while the preferred halides are the 2-alkenyl halides having the type formula $CHR=CR'-CH_2X$ where one of the substituents R and R' is selected from the class consisting of hydrogen, alkyl, halogeno-alkyl, and halogen, and the other is hydrogen; X is halogen. Exemplary of these halides are allyl chloride (3-chloro-propene), methallyl chloride, 2-chlorallyl chloride, 2-(choromethyl) allyl chloride, 3-chlorallyl chloride, etc.

Other halogenated alkenes containing more than two carbon atoms, e. g., 2-chloropropene, isocrotyl chloride, etc., can also be employed in our invention, although in general they are somewhat inferior to the above first mentioned halides in repressing the gelation of the polymerizing reaction mixtures. However, a mixture of isomeric dichlorobutenes (B. Pt. 130–135° C. at 760 mm.; $N_D^{20}=1.4739$) obtained as a by-product in the chlorination of isobutylene, has proven to be as efficacious as many of the simple 2-alkenyl halides in carrying out our invention. The principal component of this mixture is believed to be a chloride of the formula $CH_2=C(CH_2Cl)CH_2Cl$. For optimum flame-resistance, we prefer to employ the tenary interpolymers of styrene, the fumarate, and 2-chlorallyl chloride or 2-chloromethyl allyl chloride.

The styrene used in the preparation of our new interpolymers may be wholly or partly replaced by para-substituted styrenes, such as p-chlorostyrene and p-methylstyrene.

The relative proportions of the styrene and the fumarate may be varied over a considerable range, including from 1% to 500% of styrene on the weight of fumarate, depending upon the physical properties desired in the polymeric product. The amount of the halide used also may be varied in the range from 10% to 500% on the weight of the fumarate, and will determine the amount of chloromethyl groups in the resulting interpolymer. Copolymerization of styrene and the fumarate with as little as 10% of the allylic halide (based on the weight of the fumarate) retards gelation of the reaction mixture during the early stages of the polymerization, and insures the production of a soluble, fusible product. The higher the amount of the halide present, the higher is the proportion of the monomeric styrene and fumarate which can be converted to the polymeric stage without insolubilization.

The interpolymers can be cast or molded in a known manner to form rods, blocks, and sheets. They can also be dissolved in an appropriate solvent and employed as lacquers or as impregnating or water-proofing compositions.

Application of heat to compositions containing our unsaturated interpolymers, particularly in the presence of catalysts, induces further polymerization and the resulting cross-linked products are quite indifferent to attack by solvents. Suitable dyes, pigments, fillers, and plasticizers can be incorporated with our interpolymers at the soluble, fusible stage prior to final cure.

Our unsaturated interpolymers can be dissolved in many organic solvents, particularly in copolymerizable compounds containing an ethylenic linkage

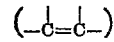

such as methyl acrylate, diallyl fumarate, vinyl acetate, allyl acrylate, etc. The resulting solutions can be totally copolymerized to insoluble, infusible products without leaving any solvent to be evaporated. Even at high solids content many of the solutions are still quite fluid and can be employed as coating materials by spraying, brushing, and dipping. They also can be employed in casting, laminating and impregnating operations, particularly where articles capable of being pre-formed and then "set" or cured in a final shape are desired. Curing temperatures of 60° C.–120° C. are suitable. Products of even lower molecular weight which are useful in such applications can be prepared by carrying out the copolymerization of styrene with the fumarate and the halide in the presence of regulators, such as carbon tetrachloride, which decrease the molecular weight of the interpolymer.

The following examples disclose our invention in more detail, the parts being by weight:

EXAMPLE 1

To illustrate our discovery that by copolymerization of styrene and an allylic fumarate with the halide, gelation of the reaction mixture is repressed, a series of interpolymerizations of styrene with varying proportions of an allylic fumarate and the halide are carried out at 60° C. in the presence of benzoyl peroxide catalyst. Copolymerizations of styrene and the fumarate with the previously mentioned mixture of dichlorobutenes are also included. The polymerizations are halted at the point of incipient gelation by cooling and adding a trace of hydroquinone as a polymerization inhibitor. The interpolymers are isolated by pouring the reaction mixtures into ligroin and the precipitated polymers are further purified by repeatedly dissolving them in acetone and precipitating with ligroin. After drying to constant weight the conversion of monomers to polymer is determined.

The data are summarized below in Table I wherein the weights of the copolymerizable monomers, peroxide catalyst and the polymeric product are tabulated together with the times elapsed at the point of incipient gelation, except those marked with an asterisk (*), which did not gel. For purposes of comparison only, styrene is interpolymerized with the fumarates under identical conditions but in the absence of the halides. It is apparent that the copolymerization of sufficient amounts of the halide, with the styrene and the fumarate leads to high yields of soluble, fusible interpolymers. Comparison of I-a with I-b clearly demonstrates the effect of even small amounts of the halides in increasing the amount of conversion of a monomeric mixture of styrene and the fumarate to the soluble, fusible polymeric form. I-i and I-k illustrate the variation in the yield of soluble, fusible interpolymer which can be secured by varying the copolymerizable halide.

Table I

| Ex. | Styrene | Diallyl Fumarate | Dimethallyl Fumarate | Allyl Chloride | Methallyl Chloride | 2-Chloroallyl Chloride | 3-Chloroallyl Chloride | Dichlorobutenes | Benzoyl Peroxide | Time to Gel Pt., hours | Yield |
|---|---|---|---|---|---|---|---|---|---|---|---|
| a | 53.3 | 100 | | | | | | | 1.53 | 2.30 | 18.4 |
| b | 53.3 | 100 | | | 10.75 | | | | 0.69 | 2.00 | 26.1 |
| c | 53.3 | 100 | | | 23.05 | | | | 1.53 | 6.00 | 41.5 |
| d | 53.3 | 100 | | | 46.10 | | | | 3.69 | 7.00 | 69.2 |
| e | 53.3 | 100 | | | 92.50 | | | | 10.00 | 11.25 | 112.0 |
| f | 53.3 | 100 | | | 114.00 | | | | 11.10 | 19.00 | 132.0 |
| g | 53.0 | 100 | | 182.0 | | | | | 8.27 | 8.00 | 84.3 |
| h | 53.0 | 100 | | 312.0 | | | | | 12.40 | *17.00 | 92.0 |
| i | 53.0 | 100 | | | | 30.6 | | | 2.14 | 14.00 | 69.0 |
| j | 53.0 | 100 | | | | 75.0 | | | 3.37 | 55.0 | 130.0 |
| k | 53.0 | 100 | | | | | 30.7 | | 2.14 | 2.0 | 23.0 |
| l | 53.0 | 100 | | | | | 76.5 | | 3.22 | 5.5 | 44.5 |
| m | 216.0 | 100 | | | 12.65 | | | | 0.981 | 9.0 | 63.4 |
| n | 216.0 | 100 | | | 28.50 | | | | 1.55 | 10.0 | 85.5 |
| o | 216.0 | 100 | | | 41.30 | | | | 1.84 | 14.0 | 108.0 |
| p | 216.0 | 100 | | | 60.30 | | | | 3.17 | 14.25 | 142.5 |
| q | 216.0 | 100 | | | 162.00 | | | | 8.55 | *43.50 | 260.0 |
| r | 26.9 | 100 | | | | | | 64.0 | 3.1 | 5.0 | 57.8 |
| s | 55.2 | 100 | | | | | | 304.0 | 8.35 | 48.5 | 183.5 |
| t | 46.5 | | 100 | | | | | | 2.20 | 12.0 | 17.6 |
| u | 46.5 | | 100 | | 323.0 | | | | 10.80 | *200.0 | 73.2 |
| v | 187.0 | | 100 | | 135.0 | | | | 8.90 | 43.0 | 183.5 |

EXAMPLE 2

A mixture of 41.6 parts of styrene, 78.4 parts of diallyl fumarate, and 108.6 parts of methallyl chloride is heated together with 4.84 parts of benzoyl peroxide for 12 hours at 86° C. The reaction is halted by cooling and the polymeric product is isolated by pouring the reaction mixture into ligroin. The precipitated polymer is further purified by repeatedly dissolving it in acetone and precipitating it with ligroin, and after drying in vacuo to constant weight, 103 parts of solid polymer are obtained.

Analysis—Found: C, 69.45%; H, 6.99%; Cl, 5.95%; Iodine number (Wijs) 127.0.

The analysis indicates a ternary interpolymer derived from approximately 30.5% by weight of styrene, 54.5% of diallyl fumarate and 15% of methallyl chloride. This corresponds to a conversion of approximately 75% of the monomeric styrene and 72% of the monomeric diallyl fumarate to the interpolymeric form. The iodine number indicates the large amount of unsaturation available for further polymerization whereby the interpolymer can be converted to an insoluble, infusible resin.

Four parts of the interpolymer are dissolved in a mixture of eight parts of xylene, one part of acetone and one part of cyclohexanone, and this solution is spread on a glass panel and baked for twenty minutes at 200° C. The resulting film is smooth, clear and of high gloss. It is inert to the action of acetone, benzene, cyclohexanone and soapy water.

A solution of ten parts of the interpolymer in 4.5 parts of diallyl fumarate is heated together with 0.09 part of benzoyl peroxide for 16 hours at 60° C. and then for 3 hours at 120° C. The resulting transparent casting is unattacked by organic solvents and is substantially infusible. It has a Rockwell hardness of M-110.

EXAMPLE 3

Similarly, a mixture of 31.2 parts of styrene, 58.8 parts of diallyl fumarate and 126.7 parts of methallyl chloride is heated with 4.84 parts of benzoyl peroxide for 35 hours at 86° C. After isolating and purifying the product as in Example 2 above, 92 parts of polymeric solid are obtained.

Analysis—Found: C, 67.54%; H, 7.19%; Cl, 9.26%; Iodine number 106.6.

The analysis corresponds to a ternary interpolymer derived from approximately 26.8% by weight of styrene, 49.5% of diallyl fumarate and 23.7% of methallyl chloride. This represents a conversion of approximately 79% of the monomeric styrene and 77.5% of the monomeric diallyl fumarate to the interpolymeric form.

EXAMPLE 4

Casting compositions are prepared by dissolving samples of the interpolymer prepared in Example 3 above, in various copolymerizable monomers, and the resulting solutions are polymerized by heating at elevated temperatures with benzoyl peroxide as a polymerization catalyst. The data are summarized in Table II.

Table II

| Ex. | Interpolymer, parts | Copolymerizable Monomer, parts | | | | | Viscosity (poise) at 25° C. | Peroxide parts | Curing Time, hours | | Hardness (Rockwell M-scale) |
|---|---|---|---|---|---|---|---|---|---|---|---|
| | | Methyl Acrylate | Butyl Acrylate | Diethyl Fumarate | Diallyl Fumarate | Allyl Acrylate | | | 60° C. | 100° C. | |
| a | 10.0 | 4.5 | | | | | 17 | 0.09 | 15 | 7 | 70 |
| b | 10 | | 4.5 | | | | | 0.09 | 15 | 48 | 78 |
| c | 10 | | | 4.5 | | | | 0.09 | 24 | 5 | 112 |
| d | 10 | | | | 48 | | 85 | 0.09 | 16 | 18 | 58 |
| e | 10 | | | 2.25 | 2.25 | | | 0.09 | 16 | 7 | 85 |
| f | 10 | | | | 4.5 | | | 0.225 | 16 | 7 | 92 |
| g | 10 | | | 3.0 | 1.5 | | | 0.09 | 16 | 7 | 82 |
| h | 10 | | | | | 4.5 | | 0.18 | 24 | 5 | 107 |

EXAMPLE 5

A mixture of 20.8 parts of styrene, 44.8 parts of dimethallyl fumarate and 84.2 parts of methallyl chloride is heated with 3.22 parts of benzoyl peroxide for 31 hours at 90° C. and yields 52.6 parts of purified polymer.

Analysis—Found: C, 69.7%; N, 7.53%; H, 6.8%; Iodine number 99.

The analysis indicates a ternary interpolymer derived from approximately 26.4% by weight of styrene, 56.0% of dimethallyl fumarate and 17.6% of methallyl chloride.

A solution of 10 parts of the interpolymer in 4.5 parts of methyl acrylate (viscosity of 22 poise at 25° C.) is heated with 0.18 part of benzoyl peroxide for 72 hours at 60° C. and then for 4 hours at 100° C. The resulting casting is transparent, insoluble in common organic solvents and infusible below its decomposition temperature. The casting has a Rockwell hardness of M-76. When diallyl fumarate is substituted for methyl acrylate, the casting has a hardness of M-100.

EXAMPLE 6

A mixture of 34.6 parts of styrene, 65.4 parts of diallyl fumarate and 119 parts of allyl chloride is heated with 5.4 parts of benzoyl peroxide for 8 hours at 60° C. and yields 55 parts of purified interpolymer.

Analysis—Found: C, 70.95%; H, 6.77%; Cl, 2.5%.

The analysis indicate a ternary interpolymer derived from approximately 34.0% by weight of styrene, 60.7% of diallyl fumarate and 5.8% of allyl chloride.

EXAMPLE 7

Forty-nine and nine-tenths parts of styrene are heated together with 23.5 parts of diallyl fumarate, 36.2 parts of methallyl chloride and 2.42 parts of benzoyl peroxide at 96° C. for 70 hours to yield 68.7 parts of solid polymer after purification of the reaction product.

Analysis—Found: C, 79.05%; H, 7.19%; Cl, 1.73%; Iodine number 85.8.

The analysis corresponds to a ternary interpolymer derived from approximately 58.5% by weight of styrene, 37% of diallyl fumarate and 4.5% of methallyl chloride.

Ten parts of the interpolymer are dissolved in 4.5 parts of methyl acrylate and the resulting solution (viscosity of 11 poise at 25° C.) is heated with 0.09 part of benzoyl peroxide for 18 hours at 60° C. and then for 5 hours at 120° C. The resulting casting has a hardness of M-41.

While we have shown and described various embodiments of the invention, it is to be understood that the invention is susceptible to those modifications which appear within the spirit of the invention and the scope of the appended claims.

Having thus described our invention, what we claim and desire to protect by Letters Patent is:

1. A soluble unsaturated interpolymerizate of a vinyl-aromatic compound of the formula

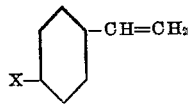

where X is a radical selected from the group consisting of hydrogen, methyl, and chlorine, a compound selected from the group consisting of diallyl fumarate, dimethallyl fumarate, and di-(2-chloroallyl) fumarate, and a chlorinated alkene having from 3 to 4 carbon atoms, prepared from a mix having by weight, based on the fumarate, from 1-500% of the vinyl-aromatic monomer and 10-500% of the said alkene.

2. A soluble unsaturated interpolymerizate of a vinyl-aromatic compound of the formula

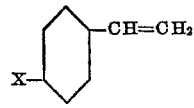

where X is a radical selected from the group consisting of hydrogen, methyl, and chlorine, a compound selected from the group consisting of diallyl fumarate, dimethallyl fumarate, and di-(2-chloroallyl) fumarate, and a chlorinated alkene having the formula $C_nH_{2n-x}Cl_x$ where $n$ is an integer of from 3 to 4; $x$ is an integer of from 1 to 2, prepared from a mix having by weight, based on the fumarate, from 1-500% of the vinyl-aromatic monomer and 10-500% of the said alkene.

3. A soluble unsaturated interpolymerizate of styrene, a compound selected from the group consisting of diallyl fumarate, dimethallyl fumarate, and di-(2-chloroallyl) fumarate, and chloride selected from the class consisting of allyl chloride, 2-chloroallyl chloride, 2-(chloromethyl) allyl chloride, and 3-chloroallyl chloride, prepared from a mix having by weight, based on the fumarate, from 1-500% of the styrene and 10-500% of the said chloride.

4. A soluble unsaturated interpolymerizate of styrene, a compound selected from the group consisting of diallyl fumarate, dimethallyl fumarate, and di-(2-chloroallyl) fumarate, and a chlorinated alkene having the formula $$C_nH_{2n-x}Cl_x$$

where $n$ is an integer of from 3 to 4; $x$ is an integer from 1 to 2, prepared from a mix having by weight, based on the fumarate, from 1-500% of the styrene and 10-500% of the said alkene.

5. A soluble unsaturated interpolymerizate of styrene, a compound selected from the group consisting of diallyl fumarate, dimethallyl fumarate, and di-(2-chloroallyl) fumarate, and allyl chloride, prepared from a mix having by weight, based on the fumarate, from 1-500% of the styrene and 10-500% of the said chloride.

6. A soluble unsaturated interpolymerizate of styrene, a compound selected from the group consisting of diallyl fumarate, dimethallyl fumarate, and di-(2-chloroallyl) fumarate, and methallyl chloride, prepared from a mix having by weight, based on the fumarate, from 1-500% of the styrene and 10-500% of the said chloride.

7. An organic solvent solution of a soluble unsaturated ternary interpolymerizate of a vinyl-aromatic compound of the formula

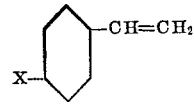

where X is a radical selected from the group consisting of hydrogen, methyl, and chlorine, a compound selected from the group consisting of diallyl fumarate, dimethallyl fumarate, and di-(2-chloroallyl) fumarate, and a chlorinated alkene having from 3 to 4 carbon atoms, prepared from a mix having by weight, based on the fumarate, from 1-500% of the vinyl-aromatic monomer and 10-500% of the said alkene, in which the organic solvent contains an ethylenic linkage and is substantially completely polymerizable with the said soluble ternary interpolymerizate whereby to produce a solution which can be totally interpolymerized to an insoluble, infusible product.

8. A method which comprises interpolymerizing with heat and in the presence of a peroxidic polymerization catalyst a vinyl-aromatic compound of the formula

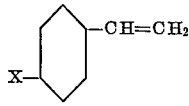

where X is a radical selected from the group consisting of hydrogen, methyl, and chlorine, a compound selected from the group consisting of diallyl fumarate, dimethallyl fumarate, and di-(2-chloroallyl) fumarate, and a chlorinated alkene having from 3 to 4 carbon atoms the percent by weight, based on the fumarate, of the vinyl-aromatic monomer being from 1–500%, and of the said alkene being 10–500%, the polymerization being carried out at a temperature in the range from about 25° C. to about 120° C., and halting the polymerization before the gel point, to form a soluble, fusible unsaturated ternary interpolymerizate of said monomers.

PLINY O. TAWNEY.
JEROME G. KUDERNA, JR.

REFERENCES CITED

The following references are of record in the file of this patent:

UNITED STATES PATENTS

| Number | Name | Date |
|---|---|---|
| 2,378,195 | D'Alelio | June 12, 1945 |
| 2,392,756 | Mighton | Jan. 8, 1946 |
| 2,419,221 | Kenyon et al. | Apr. 22, 1947 |

Certificate of Correction

Patent No. 2,498,099                                                       February 21, 1950

PLINY O. TAWNEY ET AL.

It is hereby certified that errors appear in the printed specification of the above numbered patent requiring correction as follows:

Column 4, lines 37 and 40, for the words "an allylic" read *the*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*